ns patent [19]

Samra

[11] 3,905,017
[45] Sept. 9, 1975

[54] VEHICLE SIGNAL WITH THROUGH CASING BRACKETS

[76] Inventor: Herb G. Samra, 1606 N. 74th Ct., Elmwood Park, Ill. 60635

[22] Filed: July 1, 1974

[21] Appl. No.: 484,764

[52] U.S. Cl. .................. 340/95; 340/119; 240/8.18
[51] Int. Cl.² .......................................... B60Q 1/32
[58] Field of Search ....... 340/95, 84, 107, 119, 138, 340/143, 145; 240/72, 85, 8.18, 240/41.6, 44, 52.1

[56] References Cited
UNITED STATES PATENTS

| | | | |
|---|---|---|---|
| 3,432,808 | 3/1969 | Fleece | 340/84 |
| 3,541,321 | 11/1970 | Spiteri | 240/52.1 X |
| 3,643,086 | 2/1972 | Shaw | 240/41.6 |

*Primary Examiner*—Donald J. Yusko
*Attorney, Agent, or Firm*—Hill, Gross, Simpson, Van Santen, Steadman, Chiara & Simpson

[57] ABSTRACT

A visual signal device for vehicles which includes a casing mounting illuminating means and carrying an indicia equipped windowpane wherein the ends of the casing are slotted with casing mounting brackets in the slots and end fasteners locking the casing to the brackets in desired positions to beam the indicia from the vehicle in an attention commanding manner when the illuminating means are lit. Prior to tightening the fasteners, the casing can be tilted and raised and lowered and if desired, the brackets can be arranged to be shifted horizontally so that the casing will be accurately mounted, for example, on the rear deck of an automobile to most efficiently beam a word message through the rear window of the automobile. The illuminating means are activated from a switch and flasher assembly easily mounted on the dashboard of the vehicle adjacent the driver's seat.

21 Claims, 13 Drawing Figures

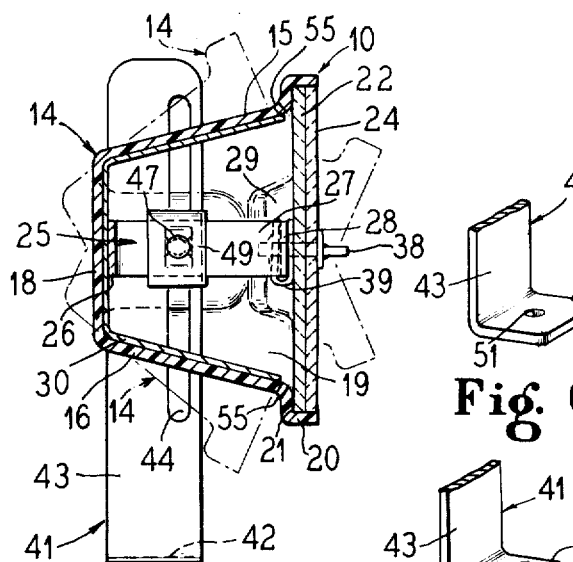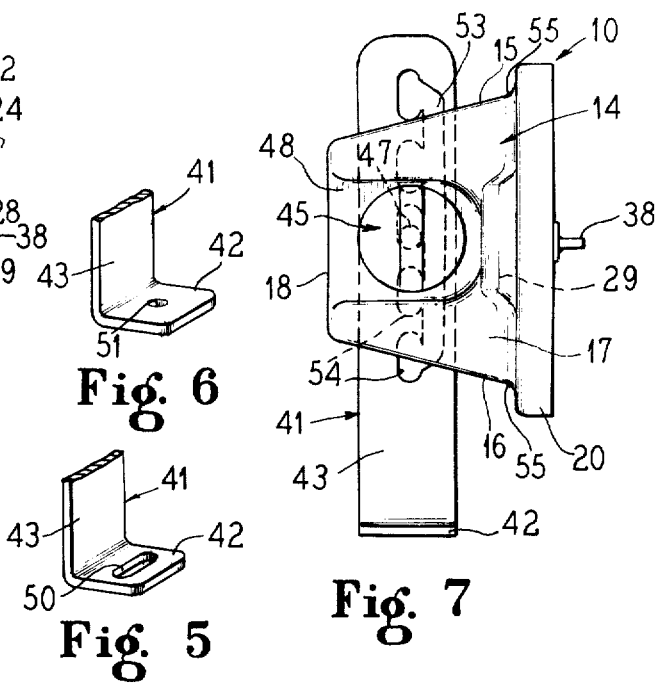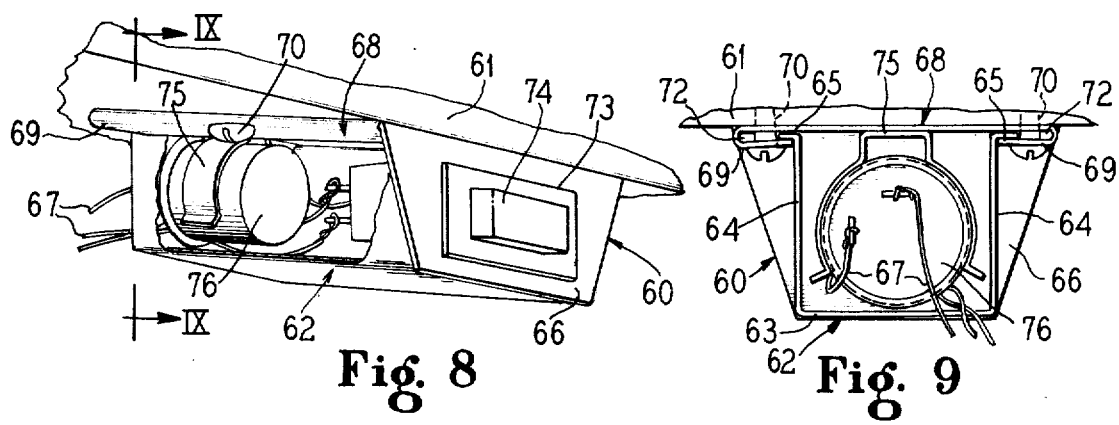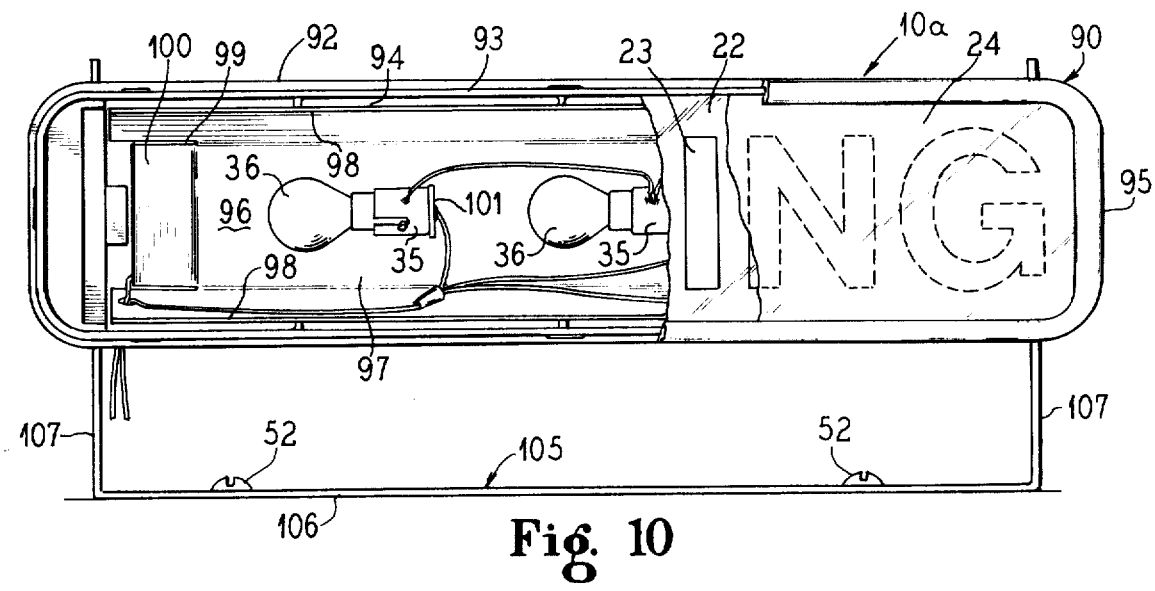

VEHICLE SIGNAL WITH THROUGH CASING BRACKETS

BACKGROUND OF THE INVENTION

1. Field of the Invention

This invention relates to improvements in vehicular visual signalling systems and particularly deals with through casing bracket mountings for the casing of such systems.

2. Prior Art

In my U.S. Pat. Nos. 3,656,104 issued Apr. 11, 1972 and 3,800,430 issued Apr. 2, 1974, vehicle signal units have elongated casings carrying electrical illuminating means behind a window on which indicia is applied in such a way as to beam a word message from the vehicle when the illuminating means are lit. These casings are mounted by brackets which straddle the end walls of the casing. The brackets are tightened against the end walls to secure the casing in a fixed adjusted position by means of wing nuts or the like fasteners threaded into the ends of the casing. The casing had a bracket therein with sockets for lamp bulbs projecting toward the window as in my U.S. Pat. No. 3,656,104 or had a rigid arcuate reflector supporting the lamp bulb sockets which was slidably mounted in the casing as in my U.S. Pat. No. 3,800,430.

SUMMARY OF THIS INVENTION

This invention now improves the casing and bracket mountings of my prior aforesaid U.S. Pat. No. 3,656,104 and U.S. Pat. No. 3,800,430 by inserting the brackets through slots in the ends of the casing and then clamping the casing ends on the brackets by means of end fasteners. This arrangement greatly simplifies the mounting and adjusting of signal devices on vehicles so that they will beam a message from the vehicle in the most effective attention commanding manner. The casing can be raised or lowered or tilted relative to the brackets until the fasteners are tightened to clamp the brackets along their entire lengths enclosed in the slots so that an effective pressure lock is obtained holding the casing in fixed adjusted relation. The slots in the ends of the bracket are preferably close to the front ends of the casing for increasing the tilting angle. The brackets can also have slots in the bottom mounting feet thereof so that they are easily horizontally adjusted prior to the tightening of fasteners which fixedly secure them to the deck in front of the rear window of an automobile vehicle or the like. If desired, the brackets can be in the form of a one piece U-shaped member with a base leg for mounting on the vehicle and upstanding legs extending through the casing slots.

The casing is preferably composed of a high strength, high impact resisting molded plastic material such as acrylonytrile butadiene styrene, a high density polyethylene, or the like. The casing preferably has a narrow front wall with diverging top and bottom walls and slotted end walls defining a window opening at the rear of the casing of greater height than the front wall. This window opening is covered first with a preferably translucent windowpane having indicia such as a word message silk-screened thereon and this windowpane is then covered with a tinted or translucent pane which obscures or hides the indicia until illuminating means in the casing are lit. The windowpanes are secured in position by a peripheral frame or by fasteners threaded into the casing. Word messages such as "Parking"; "Help"; "Standing" and the like can be silk-screened on the underlying windowpane. Alternately, the silk-screened underlying windowpane may be covered or coated with a suitable translucent or transparent ink or paint as a substitute for an overlying windowpane. Other types of translucent or transparent material, of course, could be used as other alternates.

The illuminating means in the casing are carried from a mounting bracket extending along the length of the inner face of the front wall of the casing and having side legs extending adjacent the end walls of the casing to outturned flanges. The fasteners for clamping the slotted ends of the casing to the brackets can be threaded through securing devices such as Tinnerman fasteners carried by the legs and fasteners for the windowpanes can also be threaded through Tinnerman fasteners carried by the outturned flanges of the bracket.

A metal reflector is clamped behind the bracket against the inner face of the front wall of the casing and upstanding socket carrying mountings are secured at desired positions on the bracket to carry conventional automobile type light bulbs sidewise in the casing thereby permitting use of a shallow casing and still allow ample space between the light bulbs and windowpane.

The illuminating means are energized from a control switch connected to the battery or other hot line of the automotive vehicle such as, for example, the ignition switch. The control switch is conveniently mounted on the dashboard of the vehicle and is carried in a drawer-like casing clamped by mounting fasteners to the bottom wall of the dashboard for example. The switch preferably lights up and flashes when the signal is activated and the flasher unit also keeps the driver alert to the activated signal device.

It is then an object of this invention to improve visual signal devices for vehicles of the type disclosed in my prior U.S. Pat. Nos. 3,656,104 and 3,800,430.

Another object of the invention is to provide casings for vehicle signal systems with mounting brackets extending through the casings and clamped to the casings at desired positions for carrying the casing to most effectively beam a message from the vehicle.

Another object of the invention is to provide visual signal devices for vehicles having slots in the ends thereof receiving mounting brackets and fastener means for contracting the slots to pressure lock the casing on the brackets at a selected height and tilting angle.

Another object of the invention is to provide a slot mounting for brackets of visual signal devices which will increase the permissible tilting angle of the devices relative to the brackets.

Another object of the invention is to provide an improved molded plastic casing for visual signal devices.

A further object is to provide an improved reflector and illuminating means support for visual signal devices.

A still further object of the invention is to provide an improved driver actuated switch mounting for visual signal devices.

Other and further objects of this invention will become apparent to those skilled in this art from the following detailed description of the annexed sheets of drawings which, by way of preferred examples, illustrate several embodiments of the invention.

IN THE DRAWINGS:

FIG. 4 is a vertical sectional view of the casing and bracket mounting taken generally along the line IV—IV of FIG. 2;

FIG. 5 is a fragmentary perspective view of the foot end of the bracket of FIG. 4;

FIG. 6 is a view similar to FIG. 5 but illustrating a modified foot arrangement;

FIG. 7 is an end elevational view of the casing and bracket assembly illustrating a modified bracket slot arrangement;

FIG. 8 is a perspective view with portions broken away, showing the switch casing arrangement of this invention mounted under a vehicle dashboard;

FIG. 9 is a vertical sectional view along the line IX-IX of FIG. 8;

FIG. 10 is a rear end elevational view, with portions broken away to show underlying parts, of another modified bracket and casing;

Figure 1:
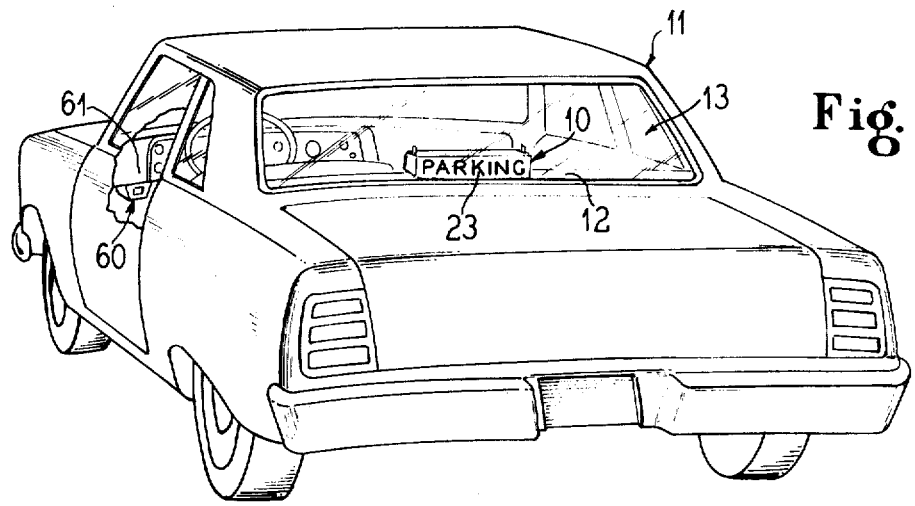
FIG. 1 is a rear end perspective view of an automotive vehicle equipped with the improved signal device of this invention.

AS SHOWN ON THE DRAWINGS:

As shown in FIG. 1, the signalling unit 10 of this invention is mounted in the passenger compartment of an automobile 11 on the deck 12 in front of the rear window 13. The deck 12, as is customary, extends from the back of the seat to the bottom of the window and may, in different makes of automobiles, vary considerably in height relative to the bottom of the rear window 13, in width, and inclination, some decks being horizontal and others inclining from the seat to the bottom of the rear window.

Instead of mounting the unit 10 in the passenger compartment of the vehicle 11, it can be mounted on the outside of the vehicle, for example, on the deck area between the rear window and the trunk lid.

As shown in FIGS. 2, 3, 4, and 7, the unit 10 is composed of a molded plastics rectangular casing 14 with top and bottom walls 15 and 16, end walls 17, a front wall 18, and a rear opening 19. The top and bottom walls 15 and 16 diverge from the front wall 18 to an enlarged peripheral rim 20 surrounding the opening 19. Thus, the front wall 18 is of substantially less height than the peripheral rim 20.

The rim 20 has a shoulder 21 inwardly from the open end thereof and a windowpane 22 snugly fits within the rim and is bottomed on the shoulder 21. This windowpane 22 may be composed of glass or translucent plastic material and has light blocking indicia 23 printed thereon to define a word such as "Parking" which is to be beamed from the vehicle. A tinted overlying windowpane 24 covers the pane 22 and is composed of glass or plastic material which will obscure the indicia 23 of the windowpane 22, rendering it rather inconspicuous until illuminating means in the casing are lit whereupon the indicia will be clearly visible in an attention commanding manner.

A metal bracket strip 25 is mounted in the casing 14 with an elongated leg 26 overlying the inner face of the front casing wall 18 and with rearwardly extending side legs 27 overlying the end walls and having outturned flanges 28 extending into pockets 29 provided in the end walls 17.

A reflector liner 30 composed of thin sheet metal or foil covers the top and bottom walls 15 and 16 and the front wall 18 of the casing 14 and underlies the leg 26 of the strip 25. Rivets 31 extending through the front wall 18 of the casing and the leg 26 of the bracket 25 clamp the liner 30 to the casing.

Angle brackets 32 are mounted at desired spaced intervals in the casing 14 and have legs 33 secured as by rivets 34 to the leg 26 of the strip 25. Legs 34 extend rearwardly from the legs 33 into the casing and carry lamp sockets 35 extending parallel with the leg 26 of the strip 25 so that light bulbs 36 carried by these sockets 35 will have their filaments 37 extending lengthwise of the windowpanes 22 and 24. The brackets 32 are positioned along the length of the leg 26 of the strip 25 to carry light bulbs at desired spaced intervals so that the windowpanes will be uniformly illuminated along the lengths thereof. The positioning of the lamp bulbs lengthwise reduces the required depth for the casing 14 and permits the lamp bulb filaments to be positioned broadside or parallel to the windowpane means to eliminate dark spots in the lighting of the windowpane means.

The windowpanes 22 and 24 have holes therethrough adjacent the ends thereof receiving thumb screws 38 therethrough. The screws 38 extend through holes in the flanges 28 of the strip 25 and Tinnerman type clips 39 on the flanges 28 provide nuts for the thumb screws 38 so that tightening of the screws will secure the windowpanes 22 and 24 tightly against the shoulder 21 of the rim 20. The Tinnerman clips and the thumb screws extend into the pockets 29 molded into the end wall 17 of the casing 14.

The ends 17 of the casing 14 have slots 40 therethrough. These slots open through the top and bottom walls 15 and 16 and through the front wall 18 of the casing 14.

Mounting brackets 41 having horizontal legs 42 secured to the deck 12 of the vehicle, for example, have upstanding legs 43 extending through the slots 40. These upstanding legs 43 in turn have elongated slots 44 close to the rear edges thereof. The width of the slots 40 and the thickness of the legs 43 are correlated so that the legs 43 can slide through the slots.

Thumb screws 45 having heads 46 and threaded shanks 47 are provided at the ends 17 of the casing 14 with the heads 46 seated in recesses 48 provided in the ends 17 and with the shanks 47 extending freely through holes in the end walls, through the slots 44 of the bracket legs 43 and through holes in the legs 27 of the bracket strip 25. Tinnerman clips 49 are carried by the legs 27 around the holes therethrough to provide nuts receiving the threaded shanks 47 of the fasteners 45. When the fasteners 45 are tightened to seat their heads 46 against the end walls 17 the slots 40 in the end walls will be contracted to tightly clamp the bracket legs 43 to the casing.

Figure 2:
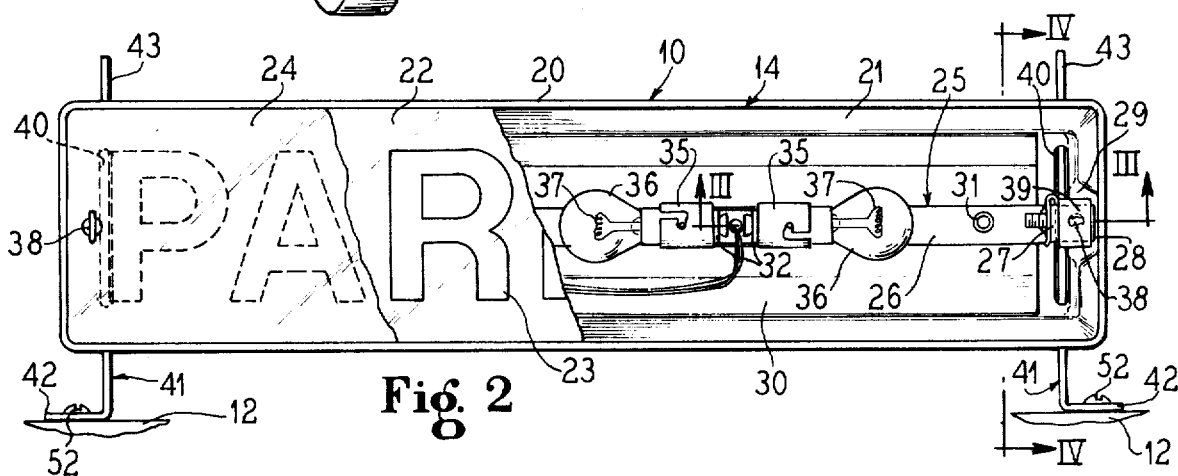
FIG. 2 is a rear end elevational view of the signal device casing with the through brackets and with portions of the windowpanes broken away to show underlying structure.
Figure 3:
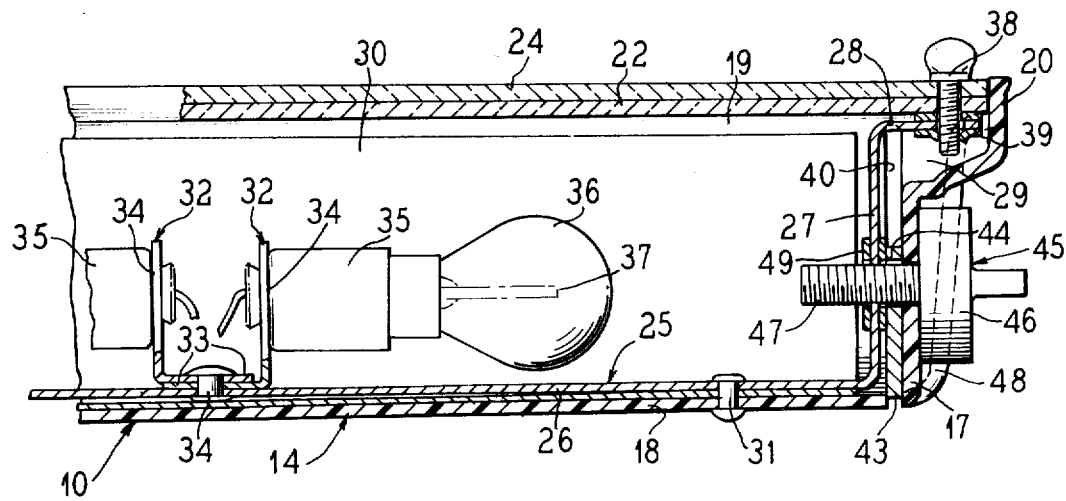
FIG. 3 is a horizontal sectional view of a portion of the casing of FIG. 2 taken along the line III—III of FIG. 2.

As shown in FIGS. 5 and 6, the horizontal legs or feet 42 of the brackets 41 can either have an elongated slot 50 parallel with the leg 43 as in FIG. 5 or a circular hole 51 therethrough as in FIG. 6. Then when fasteners 52 inserted through these holes as shown in FIG. 2 are tightened into the deck 12, the brackets will be fixedly mounted on the vehicle to carry the upstanding legs 43 thereof at the desired location for mounting the casing 14. The slot 50 will accommodate shifting of the brackets toward and away from the rear window 13 to provide horizontal adjustment for the mounting. With the brackets mounted in position, the casing can be adjusted along the height of the bracket legs 43 and can be tilted upwardly or downwardly as illustrated by the dotted lines in FIG. 4 for positioning the windowpanes 22 and 24 at the desired height and inclination to beam the word message in the most attention commanding manner. The casing is then locked in the adjusted position merely by tightening the fasteners 45 whereupon the slotted end walls will be contracted to tightly grip the bracket legs 43. The slots 44 of the bracket legs 43 are sufficiently long so that the casing can be dropped to a level resting on the deck 12 if desired. The tapered top and bottom walls 15 and 16 of the casing and the spacing of the slots 44 adjacent the rear edges of the bracket legs 43 will accommodate wide angle tilting of the casing 14. For example, when the casing is mounted close to the deck 12, its tapered bottom wall 16 will accommodate upward tilting of the casing without hindrance from the deck.

As shown in FIG. 7, the bracket 41, instead of having a straight, elongated slot 44 as in FIG. 4, can have a keyhole type of slot with an elongated vertical slot portion 53 close to and parallel with the rear edge of the bracket leg 43 and communicating through its front edge with a plurality of spaced superimposed short vertical slots or keyholes 54. The fastener shank 47 can thus slide through the elongated slot portion 53 to a desired level and then dropped into the adjacent short slot or keyhole 54 where it will rest on the bottom of the slot to provide a fixed level for the casing 14.

Small ventilating holes 55 can be provided along the lengths of the top and bottom casing walls 15 and 16 to permit air circulation through the casing 14 for dissipating heat from the lamp bulbs 36.

As shown in FIGS. 1, 8, and 9, a control switch unit 60 is mounted under the dashboard 61 of the vehicle 11 closely adjacent the driver's seat. This unit 60 has an open top U-shaped metal housing or casing 62 with a bottom wall 63, side walls 64, and outturned flanges 65 at the tops of the side walls 64. The side walls can flex to provide a spring effect for pressing against a cover plate as hereinafter described. The cover plate provides a front wall 66 to close the front of the housing 62. The rear wall of the housing is open to afford easy access for electrical wires 67.

A mounting plate 68 with inturned sides 69 is secured to the bottom of the dashboard 61 by fasteners 70 extending through the inturned sides 69 and through the overlying plate. The inturned sides 69 provide tracks 72 receiving the flanges 65 of the casing 62 which thus slides like a drawer from the rear end of the plate 68 to bottom against the front wall 66. The sides 64 of the U-shaped casing 62 will press against the inner edges of the inturned sides 65 of the plate 68 to grip the casing. Alternately, the U-shaped casing can be squeezed to snap the flanges 65 into the tracks 72. The fasteners 70 can extend through holes in the flanges 65 to lock the drawer-like casing 62 in the tracks or the fasteners 70 can press the inturned sides 65 tightly against the flanges.

The front wall 66 of the plate 68 has a central aperture receiving a switch assembly 73 having a push-button 74 which illuminates when the switch is activated to close a circuit for lighting the light bulbs 36.

A spring clip 75 is suspended from the plate 68 into the casing 62 to releasably carry a cylindrical flasher unit 76 so that when the switch 73 is closed, the current will be momentarily interrupted to cause the light bulbs to flash on and off.

Figure 13:
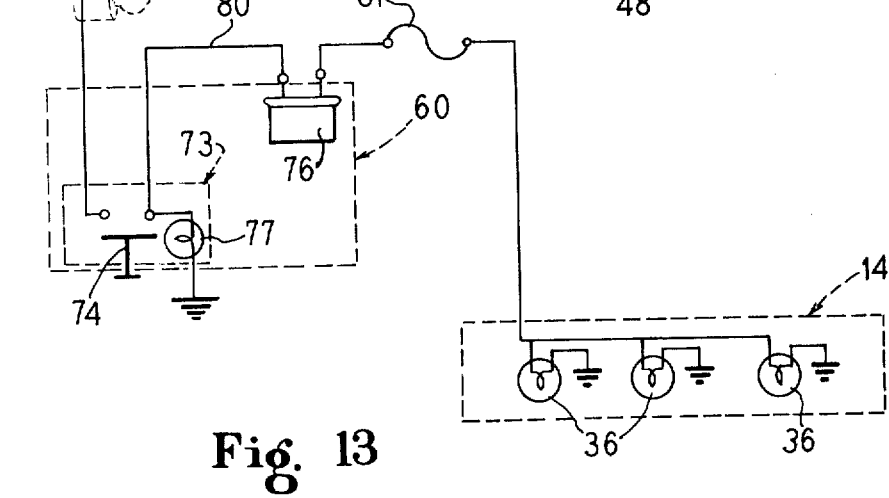
FIG. 13 is a wiring diagram for the illuminating means of the signal device.

As shown in the circuit diagram of FIG. 13, the switch assembly 60 includes the push-button 74 for the switch 73, the flasher unit 76, and a light bulb 77 to illuminate the switch button 74. Current from the automobile battery B or other source of current on the vehicle is fed to the switch 73 through a hot line 78 into which the ignition switch 79 for the vehicle may be interposed so that the switch 73 cannot be activated unless the ignition switch is on. This is an optional feature since the hot line 78 may be connected directly to the switch 73. The switch 73 closes a circuit 80 including the flasher unit 76 in series and a fuse 81 which may be a conventional fuse of the electrical system of the vehicle. The circuit energizes the three illustrated lamp bulbs 36 in the casing 14 and also the bulb 77 to light up the switch button 74. The lamp bulbs 36 are illustrated as connected in parallel so that failure of one bulb will not affect operation of the others.

Figure 12:
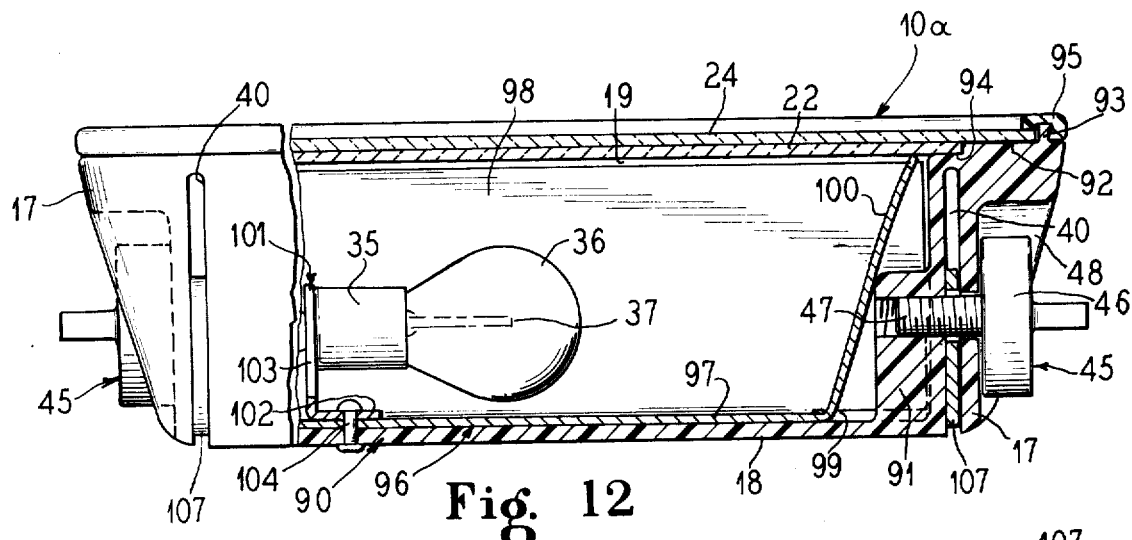
FIG. 12 is a top plan view of the casing and bracket assembly of FIG. 11 with parts shown in horizontal section along the line XII—XII of FIG. 11.
Figure 11:
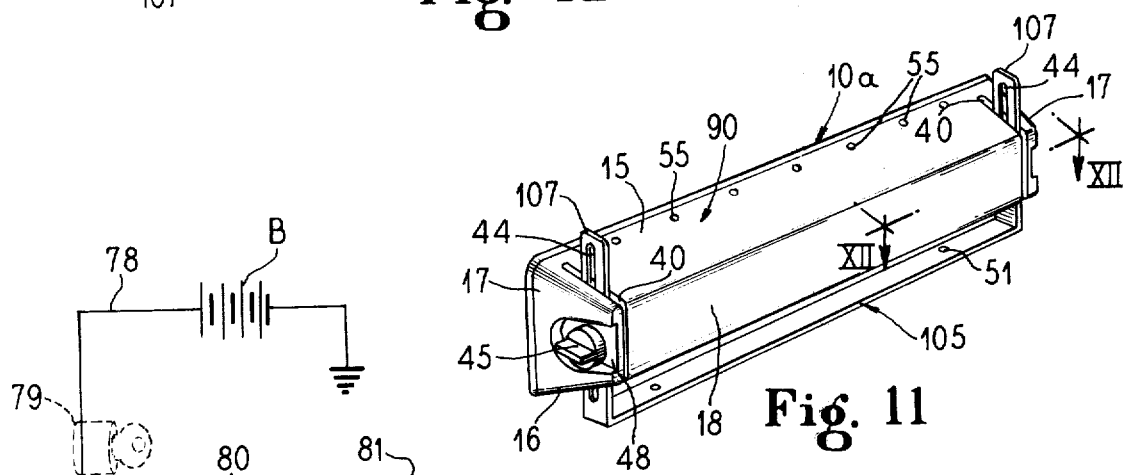
FIG. 11 is a perspective view of the bracket and casing of FIG. 10.

In the modified unit 10a of FIGS. 10 to 12, parts corresponding with parts described in FIGS. 2 to 7 have been marked with the same reference numerals.

The unit 10a includes a molded plastic casing 90 with the same front wall 18, diverging top and bottom walls 15 and 16, end walls 17, and slots 40 as the casing 14. However, as best shown in FIG. 12, the end walls 17 have thickened integral portions 91 into which are threaded the shanks or stems 47 of the fasteners 45.

The open rear end 19 of the casing 90 is surrounded by a wide end face or marginal portion 92 with an upstanding rib 93 adjacent the periphery thereof. A groove 94 is cut around the inner periphery of this wide marginal portion 92 to snugly receive the inner windowpane 22. The outer windowpane 24 rests on the wide marginal portion 92 fitting snugly inside of the rib 93.

A frame 95 is snapped over the rib 93 and overlies the periphery of the windowpane 24 to clamp the periphery of the pane on the wide marginal surface 92 of the casing. If desired, fasteners could also be used to secure the frame 95 to the casing.

A reflector liner 96 covers the inner faces of the front wall 18 and the top and bottom walls 15 and 16 of the casing, having a flat base portion 97 overlying the front wall 18 and rearwardly projecting sloping side wall portions 98 overlying the top and bottom walls 15 and 16. The ends of the reflector 96 are slit as at 99 to provide tongues 100 which will overlie the thickened portions 91 of the end walls 17. The reflector liner 96 thus forms a box-like member open only at the rear end of the casing.

Angle brackets 101 have base legs 102 overlying the wall 97 of the liner 96 at spaced intervals and upstanding legs 103 carrying the lamp sockets 35. The legs 102 are riveted to the front wall 18 of the casing 14 by rivets such as 104 which also serve to clamp the wall 97 of the liner 96 tightly to the casing.

A one-piece mounting bracket 105 is provided for the unit 10a. This bracket 105 has an elongated base leg 106 and upstanding end legs 107. The end legs 107 have the vertical slots 44 along the length thereof and the base leg 106 has openings 51 therethrough receiving the fasteners 52. The legs 107 are clamped to the end walls 17 by tightening the fasteners 45 into the thickened portions 91 of the end walls, thereby contracting the slots 41 and tightly gripping the legs 107 in the end walls.

The casing 90 is adjusted on the bracket 105 in the same manner as the casing 14 is adjusted on the brackets 41.

From the above descriptions it will, therefore, be clear that the invention provides improved visual signal devices including through casing mounted brackets, improved lamp bulb mounting means, new reflector arrangements, and many other desirable features.

It will also be understood that only preferred embodiments of the invention have been illustrated and variations and modifications may be effected without departing from the scope of the invention.

I claim as my invention:

1. A vehicle signal device comprising a casing having top, bottom, front, and end walls with a window opening in the rear side thereof, said end walls having slots opening through the top and bottom thereof, bracket means having slotted leg portions extending into said end walls slots, and fasteners extending through the end walls and slots of the bracket means for clamping the end walls on the bracket means to fixedly mount the casing in an adjusted position relative to the bracket means so that the window opening can be accurately positioned relative to a vehicle.

2. A vehicle signal device comprising a casing having slotted end walls and an open window in one side thereof, windowpane means removably mounted in said open window and having indicia thereon which is not conspicuously visible, lamp means mounted in said casing behind said windowpane means to illuminate the indicia and render it conspicuous, mounting bracket means for said casing having leg portions extending into the slotted end walls of the casing and fasteners clamping the bracket leg portions in the slots of the end walls to lock the casing for positioning the windowpanes at a desired level and inclination to beam the indicia thereon from the vehicle in the desired direction.

3. A vehicle signal device comprising a molded plastic casing having a front wall, top and bottom walls diverging from said front wall, slotted end walls closing the ends of the casing with the slots opening through the front wall and the top and bottom walls, a rim around the rear ends of the end walls and top and bottom walls providing an enlarged open window, windowpane means bearing a word message indicia mounted in said rim, bracket means adapted to be mounted on a vehicle having upstanding slotted legs extending into the slots of the end walls of the casing, and fasteners in the end walls of the casing having shank portions extending across the slots and through the slots of the bracket legs into threaded engagement with the casing so that when the fasteners are tightened, the end wall slots will be collapsed to tighten the end walls securely against the bracket legs, a plurality of lamp sockets in the casing mounted at spaced intervals on the front wall of the casing, lamp bulbs removably carried by said sockets, reflector means in the casing behind the lamp bulbs, a switch casing having mounting means for attachment to the dashboard of a vehicle, and a circuit including the lamp bulbs, the switch means and the electrical system of the vehicle for energizing the lamp bulbs when the switch is closed.

4. The device of claim 1 wherein the casing is a one-piece molded plastic unit.

5. The device of claim 1 including illuminating means in the casing and windowpane means in the window opening illuminated by said illuminating means.

6. The device of claim 5 including a reflector liner in the casing enveloping the illuminating means.

7. The device of claim 6 wherein the illuminating means are light bulbs with filaments extending lengthwise of the casing.

8. The device of claim 2 wherein the windowpane means includes an underlying translucent pane with indicia thereon and an overlying tinted pane obscuring said indicia.

9. The device of claim 8 including fasteners extending through the ends of the windowpanes and secured in the casing.

10. The device of claim 8 including a frame surrounding the open window of the casing securing said panes to the casing.

11. The device of claim 1 including a rigid strip in the casing overlying the front and end walls, lamp bulb sockets carried by the strip along the length of the front wall and nuts for said fasteners carried by the portions of the strip overlying the end walls.

12. The device of claim 2 including a metal strip secured in said casing carrying said lamp means and having side legs overlying the casing and walls with outturned flanges underlying the windowpane means and fasteners anchored to the flanges securing the windowpane means to the casing.

13. The device of claim 12 including a reflector liner in the casing clamped under said metal strip end and enveloping the lamp means.

14. The device of claim 3 wherein the switch casing mounts a switch with an illuminated push-button and is suspended from a mounting plate having side grooves receiving flanges of the casing.

15. The device of claim 14 wherein the casing has a clip therein and a flasher device is removably carried by said clip.

16. The device of claim 3 wherein the reflector means is a liner bent from a sheet into conformity with the casing.

17. The device of claim 2 wherein the leg portions of the bracket means have slots along the lengths thereof positioned close to the rear edges of the leg portions for increasing permissible tilting angles of the casing.

18. The device of claim 17 wherein the slots of the leg portions have superimposed notches along one side thereof to receive the fasteners.

19. The device of claim 1 wherein the bracket means are angle strips with feet portions extending from the bottom of the slotted leg portions having fastener receiving slots permitting horizontal adjustment of the bracket means.

20. The device of claim 1 wherein the bracket means is a one-piece U-shaped strip with a base portion for mounting on a vehicle and said slotted leg portions extend from the base portion.

21. A vehicle signal device comprising a casing having top, bottom, front, and end walls with a window opening in the rear side thereof, windowpane means mounted in said window opening with indicia thereon, illuminating means in the casing to beam the indicia message from the casing, bracket means adjacent the end walls of the casing, said bracket means having leg means for fastening to a vehicle and upstanding legs with elongated slots extending from said leg means and fasteners extending through the slots of the upstanding legs and end walls of the casing to clamp the slotted legs to the casing at a desired height from the leg means.

* * * * *